United States Patent
Hande et al.

(10) Patent No.: US 10,318,971 B2
(45) Date of Patent: Jun. 11, 2019

(54) NORMALIZING USER RESPONSES TO AN EVENT BY REMOVING BEHAVIORAL BIAS

(71) Applicant: Adobe Inc., San Jose, CA (US)

(72) Inventors: Sayaji Hande, Ghaziabad (IN); Ramesh Srinivasaraghavan, Bangalore (IN); Vineet Gupta, Kanpur (IN); Sandeep Zechariah George Kollannur, Kochi (IN)

(73) Assignee: Adobe Inc., San Jose, CA (US)

( * ) Notice: Subject to any disclaimer, the term of this patent is extended or adjusted under 35 U.S.C. 154(b) by 904 days.

(21) Appl. No.: 14/280,393

(22) Filed: May 16, 2014

(65) Prior Publication Data
US 2015/0278835 A1    Oct. 1, 2015

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0203* (2013.01); *G06Q 50/01* (2013.01)

(58) Field of Classification Search
CPC ............. G06Q 10/06393; G06Q 30/02; G06Q 30/0201; G06Q 30/0203; G06Q 30/0204; G06Q 50/01
See application file for complete search history.

(56) References Cited

U.S. PATENT DOCUMENTS

| | | | |
|---|---|---|---|
| 2011/0264617 A1* | 10/2011 | Eggers | G06F 17/30598 706/50 |
| 2012/0130934 A1* | 5/2012 | Brillhart | G06Q 30/0203 706/46 |
| 2013/0007644 A1* | 1/2013 | Ooga | G06Q 50/22 715/764 |
| 2013/0290207 A1* | 10/2013 | Bonmassar | G06Q 10/06 705/321 |

OTHER PUBLICATIONS

Podsakoff, P. M., Mackenzie, S. B., Lee, J., & Podsakoff, N. P. (2003). Common Method Biases in Behavioral Research: A Critical Review of the Literature and Recommended Remedies. Journal of Applied Psychology, 88(5), 879-903. (Year: 2003).*

\* cited by examiner

*Primary Examiner* — William S Brockington, III
(74) *Attorney, Agent, or Firm* — SBMC

(57) ABSTRACT

This document describes techniques for normalizing user responses by removing behavioral bias. In one or more implementations, a response normalization model is built from user responses to one or more events. The response normalization model clusters users into behavioral classification groups based on the user responses. The response normalization model can then be used to normalize user responses by removing behavioral bias from user responses.

20 Claims, 7 Drawing Sheets

Optimistic User Answers 302

Question 1  ①②③●⑤
Question 2  ①②●④⑤
Question 3  ①②③●⑤
Question 4  ①②③●⑤
Question 5  ①②●④⑤
Question 6  ①②③④●
Question 7  ①②③●⑤
Question 8  ①②③④●

Pessimistic User Answers 304

Question 1  ①●③④⑤
Question 2  ●②③④⑤
Question 3  ●②③④⑤
Question 4  ①●③④⑤
Question 5  ①②●④⑤
Question 6  ①●③④⑤
Question 7  ●②③④⑤
Question 8  ①●③④⑤

Fig. 3

NORMALIZING USER RESPONSES TO AN EVENT BY REMOVING BEHAVIORAL BIAS

RELATED APPLICATIONS

This application claims benefit of priority to Indian Provisional Application Serial No. 1619/CHE/2014 entitled "NORMALIZING USER RESPONSES TO AN EVENT BY REMOVING BEHAVIORAL BIAS" filed Mar. 26, 2014. The content of which is incorporated by reference herein in its entirety.

BACKGROUND

When answering questions on a survey, or interacting with social posts on a social network, users tend to express their innate optimism or pessimism. Thus, user responses to an event, such as a survey or social post, can be skewed by this behavioral bias of the users.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques for normalizing user responses by removing behavioral bias. In one or more implementations, a response normalization model is built from user responses to one or more events. The response normalization model clusters users into behavioral classification groups based on the user responses. The response normalization model can then be used to normalize user responses by removing behavioral bias from user responses.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

FIG. 3 illustrates an example of user responses to multiple questions of a survey.

DETAILED DESCRIPTION

Overview

Figure 1:
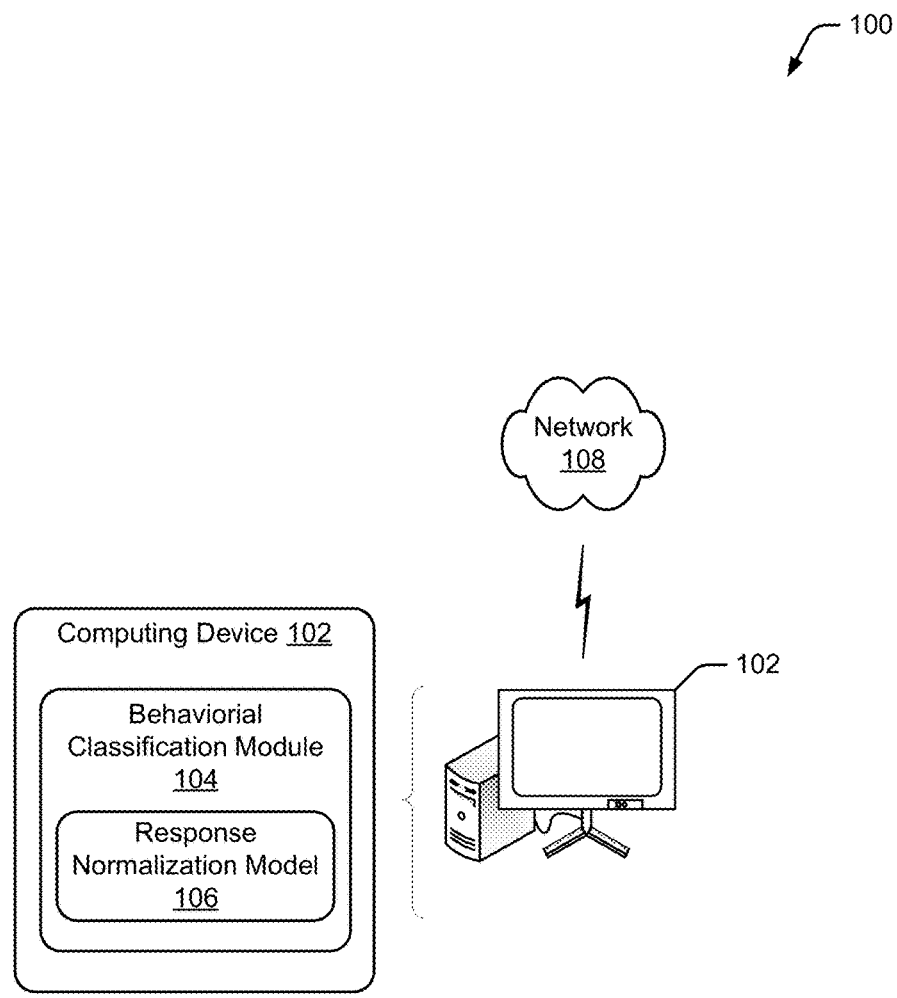
FIG. 1 illustrates an environment in an example implementation that is operable to employ techniques described herein.

When answering questions on a survey, or interacting with social posts on a social network, users tend to express their optimism or pessimism. For example, when a user responds to an event, a score of the user's response on an ordinal scale (e.g., negative to positive) is influenced by the user's behavioral bias.

Consider, for example, a survey that asks a user to rate a service on a scale of 1 to 5, where 1 corresponds to a poor or low rating and 5 corresponds to an excellent or high rating. In this case, the score which the user responds with will be a function of what the user's "inner self" truly believes as well as the user's behavioral bias. In other words, the "true response" of the user will be skewed by the user's behavioral bias. For example, user responses by optimistic users tend to be more positive than what the user's inner self truly believes, whereas user responses by pessimistic users tend to be more negative than what the user's inner self truly believes.

Thus, the true user response to an event by a population of users is often hidden by the individual behavioral biases of users in the population. For example, if the population of users responding to an event includes a high percentage of positive or optimistic users, the result of the user responses may be more positive than what the users in the population truly believe. Similarly, if the population of users responding to an event includes a high percentage of negative or pessimistic users, the result of the user responses may be more negative than what the users in the population truly believe. Conventional solutions fail to take the behavioral biases of users into account when analyzing the results of user responses to an event, and thus are unable to determine the true user response to the event.

Techniques are described for building a response normalization model from user responses to events. The response normalization model is configured to learn the mix of the different behavioral types of users in a population. For example, in one or more implementations the mix of optimistic, pessimistic, and realistic users in a population is determined by the response normalization model. The response normalization model can then be used to normalize the user responses by removing behavioral bias from the user responses to generate true user responses that correspond to what the users of the population truly believe.

To build the response normalization model, user responses to one or more events are received from users of a population. A response score can be determined for each user of the population based on the user responses. The users of the population can then be clustered into behavioral classification groups based on the response scores. The behavioral classification groups may include at least a first behavioral classification group that includes users with response scores that are lower relative to the other users of the population, and a second behavioral classification group that includes users with response scores that are higher relative to the other users of the population.

In one or more implementations, the first behavioral classification group corresponds to a pessimist group that includes users with response scores that are more negative on a negative-to-positive scale relative to the users of the population, and the second behavioral classification group corresponds to an optimist group that includes users with response scores that are more positive on the negative-to-positive scale relative to the population of users.

Identifying different behavioral classification groups may enable marketers and businesses to target each of these clusters differently. For example, the social posts presented to users in a pessimist group may be different than the social posts presented to users in an optimist group.

Furthermore, the response normalization model can be used to normalize user responses by one or more users of the population to a new event by removing behavioral bias from the user responses to generate true user responses to the new event. To normalize the user responses, the response normalization model adjusts the user responses based on the behavioral classification groups. For example, user response scores of users in a pessimist group may be increased to cancel out the negative bias of the users of the pessimist group. Similarly, user response scores of users in an optimist group may be decreased to cancel out the positive bias of the users in the optimist group. By removing the behavioral bias from the user responses, the response normalization model provides a better indication of the true user response by the users of the population.

In some cases, the true user responses can be used for stratified analysis. For example, the mean or median scores of the true user responses of pessimists can be compared with the scores of the true user response of optimists. This is important because in conventional stratified analysis processes, the pessimists and the optimists may cancel each other out which hides the true user response.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 7.

Computing device 102 is illustrated as including a behavioral classification module 104. The behavioral classification module 104 is representative of functionality to perform one or more techniques described herein. Behavioral classification module 104 is configured to build a response normalization model 106 from user responses to one or more events. Response normalization model 106 is configured to normalize user responses to an event by removing behavioral bias from the user responses. Although illustrated as part of computing device 102, functionality of the behavioral classification module 104 may also be implemented in a distributed environment, remotely via a network 108 (e.g., "over the cloud") as further described in relation to FIG. 7, and so on.

Although network 108 is illustrated as the Internet, the network may assume a wide variety of configurations. For example, network 108 may include a wide area network (WAN), a local area network (LAN), a wireless network, a public telephone network, an intranet, and so on. Further, although a single network 108 is shown, network 108 may also be configured to include multiple networks.

Generating the Response Normalization Model

Figure 2:
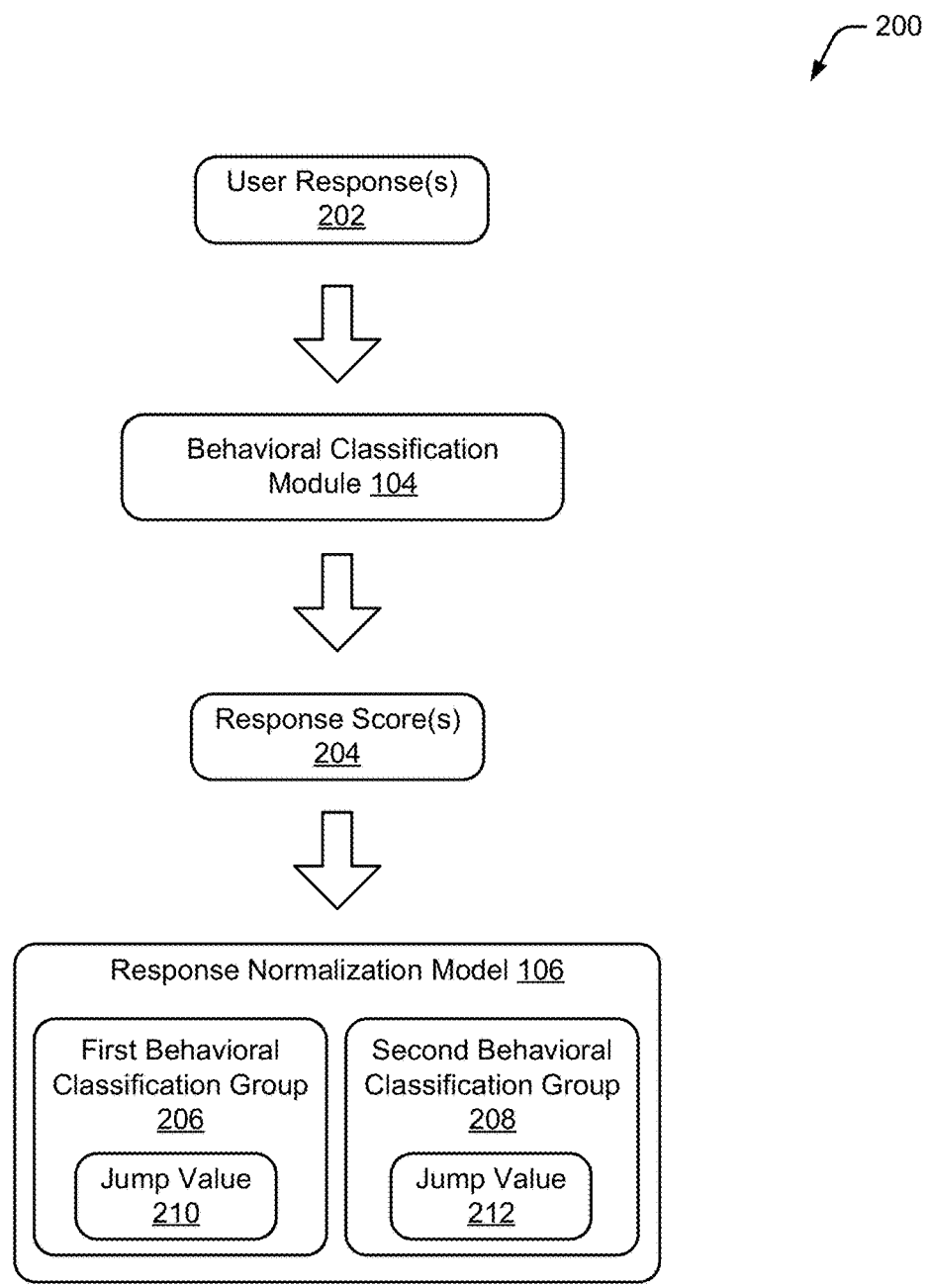
FIG. 2 illustrates a system in an example implementation in which a behavioral classification module generates a response normalization model from user responses to one or more events.

FIG. 2 illustrates a system 200 in an example implementation in which behavioral classification module 104 generates response normalization model 106 from user responses to one or more events. As described in more detail in FIG. 4, response normalization model 106 can then be used to normalize user responses to an event by removing behavioral bias from the user responses.

In this example, user responses 202 to one or more events are received by behavioral classification module 104 from users of a population. As described herein, an "event" includes any type of event which causes a measurable user response, such as a survey, a questionnaire, or a social post to a social network, to name just a few. The population can correspond to any type of population of users, such as clients, customers, or employees of an organization or business. The population can also correspond to users that subscribe, like, or follow a page or handle of a business or organization on a social network, such as Facebook®, Twitter®, or Instagram®, to name just a few.

As described herein, "user responses" include any type of user response to, or interaction with, an event. For example, if the event is a survey, user responses can include user answers to questions of the survey. As another example, if the event is a social post to a social network, user responses 202 can include user interactions with the social post, such as liking, commenting on, or sharing the social post.

Behavioral classification module 104 is configured to determine a response score 204 for each user of the population based on the user responses 202 to the one or more events. In some cases, the response score may be based on an ordinal scale, and may indicate the relative negativity or positivity of user response 202.

Response score 204 is based on multiple user responses by each user to a series of events. For example, the response score 204 may be based on user answers to multiple surveys and/or based on user interactions with multiple social posts to a social network.

When user responses 202 correspond to multiple responses to multiple events, behavioral classification module 104 can determine an individual user response score for each response by a user to each event. The response score 204 for the user can then be determined by aggregating each individual user response score, such as by summing, averaging, or taking the median of the individual user response scores for a user.

Consider, for example, FIG. 3 which illustrates an example 300 of user responses to multiple questions of a survey. In this example, the user responses each include an individual user response score in the form of a number on a scale of 1 to 5 for each of a series of questions. In this example, an answer of 1 corresponds to a poor or negative score, and an answer of 5 corresponds to a high or positive score.

Example 300 includes optimistic user answers 302 to a survey and pessimistic user answers 304 to the survey. In this case, the optimistic user has answered questions 1-8 of the survey with scores of 4, 3, 4, 4, 3, 5, 4, and 5. Thus, a response score 204 for the optimistic user can be calculated by taking an average of the scores which yields a response score of 4.0. Similarly, the pessimistic user has answered questions 1-8 of the survey with scores of 2, 1, 1, 2, 3, 2, 1, and 2. Thus, a response score 204 for the pessimistic user can be calculated by taking an average of the scores which yields a response score of 1.75.

In one or more embodiments, behavioral classification module 104 generates a response score 204 based on a user interaction, or combination of user interactions, with a social post on a social network. In this case, the response score 204 may be based on the relative negativity or positivity indicated by the user interaction or combination of user interactions. For example, a user that simply clicks a "like" button may not like the social post as much as a different user that "comments and shares" the social post.

In one embodiment, response scores 204 can be assigned to user interactions with a social post as follows: a lowest score of "1" is assigned for viewing the social post but not interacting with the social post, a low score of "2" is assigned for liking the social post, an average score of "3" is assigned for commenting on the social post, a high score of "4" is assigned for sharing the social post, and a highest score of "5" is assigned for commenting and sharing the social post. It is to be appreciated, however, that this is just one possible example of generating response scores 204 for user interactions with social posts on social networks, and that any type of criteria can be used to generate response scores from user interactions with social posts.

As described above, user responses 202 to an event are a function of a user's true response to the event and the behavioral bias of the user. For example, an optimistic user may respond to an event with a score that is higher than what the user's inner self truly believes. In contrast, a pessimistic user may respond to an event with a score that is lower than what the user's inner self truly believes.

It is to be noted, therefore, that user responses 202 may be skewed by the behavioral bias of the users in the population. For example, if the population of users responding to an event includes a high percentage of positive or optimistic users, the result of the user responses may be more positive than what the users in the population truly believe. Similarly, if the population of users responding to an event includes a high percentage of negative or pessimistic users, the result of the user responses may be more negative than what the users in the population truly believe. Conventional solutions fail to take the behavioral biases of users into account when analyzing the results of user responses to an event, and thus are unable to determine the true user response to the event.

In accordance with various embodiments, behavioral classification module 104 generates a response normalization model 106 from the user responses 202. The response normalization model is configured to learn the mix of the different behavioral types of users of the population (e.g., the mix of optimistic, pessimistic, and realistic users). The response normalization model can then be used to normalize the user responses by removing behavioral bias from the user responses to generate true user responses that correspond to what the users in the population truly believe.

To generate the response normalization model 106, the users of the population are clustered into behavioral classification groups based on the response scores 204. In example 200, the behavioral classification groups include a first behavioral classification group 206 that includes users with response scores that are lower relative to the users of the population of users, and a second behavioral classification group 208 that includes users with response scores that are higher relative to the users of the population.

In one or more implementations, first behavioral classification group 206 corresponds to a pessimist group that includes users with response scores that are more negative on a negative-to-positive scale relative to the users in the population. In this implementation, the second behavioral classification group 208 corresponds to an optimist group that includes users with response scores that are more positive on the negative-to-positive scale relative to the population of users. In some cases, this implementation may also include a realist group that includes users with response scores that correspond to an average response score of the population of users.

It is to be appreciated that any type of behavioral classification groups based on any type of ordinal scale can be used to classify the users, such as negative and positive classification groups, active and inactive classification groups, or happy and sad classification groups, to name just a few.

To cluster the users into the behavioral classification groups, the behavioral classification module 104 orders the users of the population based on the response scores 204. For example, the users can be ordered from users with low response scores 204 to users with high response scores 204. Behavioral classification module 104 then clusters the users into the different behavioral classification groups by applying one or more "cut-off" percentages to the ordered users of the population.

For example, a first predetermined cut-off percentage can be used to cluster the users with the lowest response scores 204 into the first behavioral classification group 206, and a second cut-off percentage can be used to cluster the users with the highest response scores 204 into the second behavioral classification group 208.

The cut-off percentages can be selected based on the percentage of users in a population that generally correspond to each group. Consider, for example, that in a typical population of users, 10% of the users are optimists, 20% of the users are pessimists, and 70% of the users are realists. In this example, if there are 100 users in the population, then the 10 users with the highest response scores 204 will be clustered into an optimist group, the 20 users with the lowest response scores 204 will be clustered into the pessimist group, and the remaining 70 users will be clustered into the realist group.

In one or more implementations, behavioral classification module 104 assigns a jump value to each of the behavioral classification groups. In FIG. 2, a jump value 210 is assigned to first behavioral classification group 206 and a jump value 212 is assigned to second behavioral classification group.

The jump value is configured to remove behavioral bias from user responses. Users in an optimist group tend to be influenced by their optimistic nature to respond with response scores that are high. For example, if an optimistic user's inner self has chosen a score of 3, the user is likely to "jump" or "tilt" to choose a higher score of 4 with certain probability due to the user's optimistic bias. Thus, behavioral classification module 104 may assign a jump value for the optimist group that is configured to cancel out, or remove, the optimistic bias of users in the optimist group.

Similarly, users in a pessimist group tend to be influenced by their pessimistic nature to respond with response scores that are low. For example, if a pessimistic user's inner self has chosen a score of 3, the user is likely to "jump" or "tilt" to choose a lower score of 2 with certain probability due to the user's pessimistic bias. Thus, behavioral classification module 104 may assign a jump value for the pessimist group that is configured to cancel out, or remove, the pessimistic bias of users in the pessimist group In one or more implementations, the jump value is selected to be one unit on an ordinal scale. Continuing with the example above, the behavioral classification module 104 may assign a jump value of +1 for the pessimist group, a jump value of 0 for the realist group, and a jump value of −1 for the optimist group. It is to be appreciated that these jump values will normalize user responses 202 by increasing the response score of pessimistic users by a value of 1, and decreasing the response score of optimistic users by a value of 1. Of course the jump value may correspond to any score or numerical value. For example, in some cases the jump values may be a fraction of a unit. How the jump value is used to remove the behavioral bias from user responses is described in more detail below with regards to FIG. 4.

Clustering users in a population into behavioral classification groups provides the response normalization model 106 with a good understanding of the behavioral biases of the population of users. The response normalization model 106 can then be used to normalize user responses to a subsequent event by users of the population.

Normalizing User Responses to an Event

Figure 4:
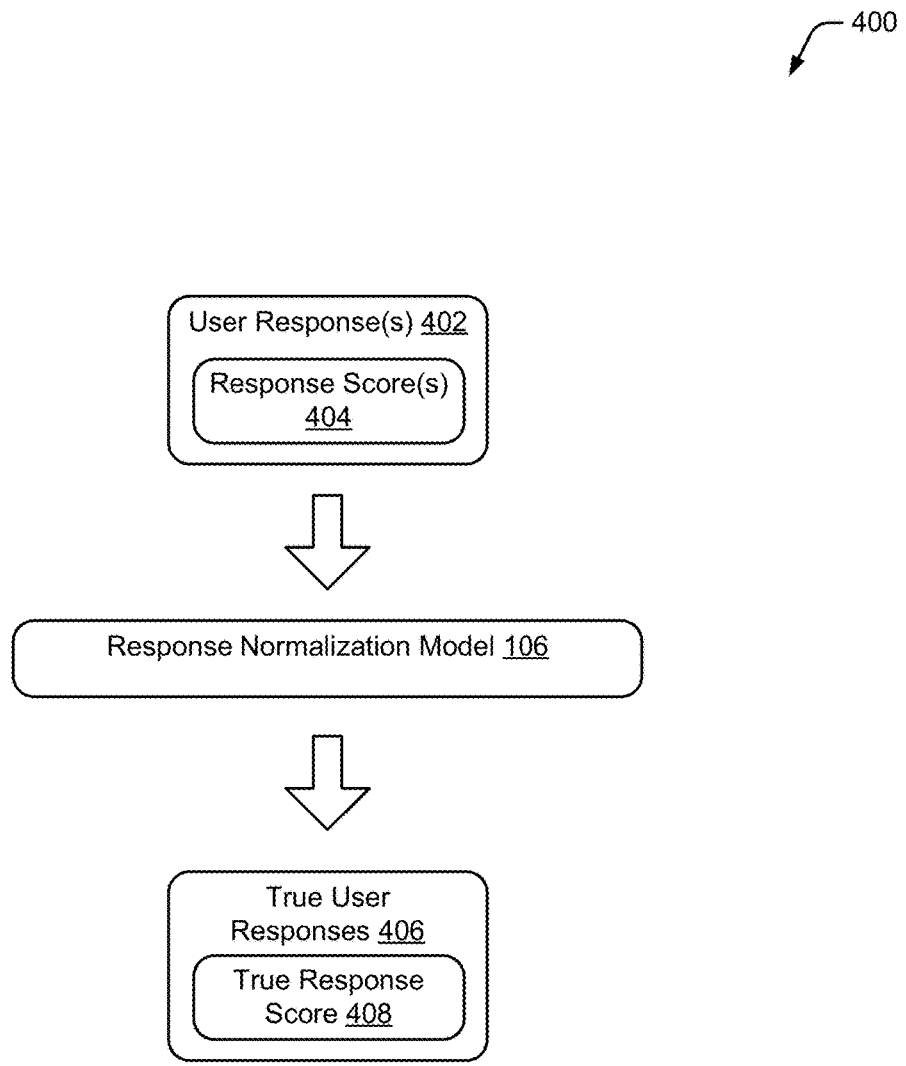
FIG. 4 illustrates a system in an example implementation in which a response normalization model is used to normalize user responses to an event by removing behavioral bias from the user responses.

FIG. 4 illustrates a system 400 in an example implementation in which the response normalization model 106, generated in FIG. 2, is used to normalize user responses to an event by removing behavioral bias from the user responses.

In FIG. 4, user responses 402 to an event are received from one or more users of the population. For example, the user responses 402 can be received in response to a survey or in response to a new social post posted to a social network.

As described in FIG. 2, behavioral classification module 104 can determine a response score 404 for each user response 402. Response score 404, however, is a function of the true response of each user and the user's behavioral bias. Therefore, behavioral classification module 104 applies response normalization model 106 to user responses 402 to normalize the user responses by removing behavioral bias from the user responses 402 to generate true user responses 406.

To do so, for each user response 402, response normalization model 106 can identify an associated user of the user response as well as the behavioral classification group of the user. The response normalization model 106 can then normalize the user response 402 by applying the jump value associated with the behavioral classification group to generate the true user response 406. The jump value may increase or decrease the response score 404 of the response to a true response score 408. In effect, therefore, applying the jump score cancels out the behavioral bias of the user.

For example, if the user is associated with the pessimist group, the response score 404 of the user response 402 can be increased by 1 unit. In other words, if a user in the pessimist group responds with a response score 404 of 2, this response score may be adjusted by increasing the response score by the jump value of 1 to a true response score 408 of 3. Similarly, if the user is associated with the optimist group, the response score 404 of the user response 402 can be decreased by one unit. In other words, if a user in the optimist group responds with a response score 404 of 5, this response score may be adjusted by decreasing the response score by the jump value of 1 to a true response score 408 of 4. If the user is associated with the realist group, however, the response score 404 of the user response 402 can remain unaltered such that the true response score 408 is equal to the response score 404.

In one or more implementations, the response normalization model 106 is configured to identify unusual user responses. As described herein, an unusual user response corresponds to a user response that includes a response score that is outside of a range of response scores associated with the behavioral classification group of the user. For example, if a user in the optimist group responds to an event with a negative response score (e.g., a score less than 3 on a scale of 1 to 5) this is unusual. Similarly, if a user in the pessimist group responds to an event with a positive response score (e.g., a score greater than 3 on a scale of 1 to 5), this is also unusual In some cases, the identification of unusual responses may trigger a notification to investigate the unusual response further. For example, if a user in the optimist responds negatively, this may indicate impending customer churn and should be investigated further. Alternately, if a user in the pessimist group responds positively, this may indicate that a business is doing something really well and this response should also be investigated further.

Implementation Examples

In one or more embodiments, behavioral classification module 104 uses a joint probability mass function to cluster users into different behavioral classification groups based on user responses to one or more events.

In this example, behavioral classification groups include a pessimist group, a realist group, and an optimist group. $X_{ij}$ corresponds to a user response of an ith user for a jth event. To begin, behavioral classification module 104 assumes that each user is in the realist group. If behavioral classification module 104 determines that a user is not in the realist group, the user is moved with a certain probability to the pessimist group or the optimist group.

Assuming a population of n total users, where $n_1$ users are in the optimist group (O), $n_2$ users are in the realist group (R), and $n_3$ users are in the pessimist group (P), with $n=n_1+n_2+n_3$, the response normalization model 106 uses the following joint probability mass function:

$$l(\vec{x}) \propto \frac{n_1!n_2!n_3!}{n!} \prod_j \prod_i \prod_r p_{ijr}^{x_{ijr}}$$

In the above equation, r corresponds to a behavioral classification group of a user, and $x_{ijr}$ corresponds to the number of users in an rth behavioral classification group that chose an ith option for a jth event. In this equation, individual $x_{ijr}$'s may not be known, but can be determined from the fact that $x_{ij}=xijP+xijR+xijO$.

Based on standard multinomial distributions it is known that a max occurs when the probability of a given cell is equated to a proportion of the count. Thus, the following algorithm can be used to estimate the parameters:

1) Cluster the users of the population so that $n_1$ users of the population are in the optimist group (O), $n_2$ users of the population are in the realist group (R), and $n_3$ users of the population are in the pessimist group (P).

2) Compute maximum likelihood estimates (MLE's) for each cluster of users. Find a likelihood value for the combined population.

3) As soon as the likelihood function is converging, stop.

The response normalization model 106 then evaluates the maximum likelihood estimates for "r" possible ordinal responses to a series of events. This estimate, when evaluated across the series of events, provides the distribution or clustering of users who are pessimistic, realistic, and optimistic. Once the population is understood, response normalization model 106 can be used to normalize user responses by removing individual behavioral biases to generate the normalized responses, as described throughout.

Determining True Quality of a Social Media Campaign

In one or more implementations, response normalization model 106 can be used to determine a true quality of a social media campaign. Behavioral classification module 104 can receive user responses from users in a population to a set of multiple campaigns (e.g., multiple social posts to a brand page on Facebook®). Each user response can include a response score on an ordinal scale. Behavioral classification module 104 clusters the users of the population, based on the response scores, to generate a response normalization model 106 for users of the population. As described above, the response normalization model 106 clusters the users, based on the different behavioral biases of the users, into different behavioral classification groups.

Subsequently, new user responses by the users in the population to a new campaign can be received by behavioral classification module 104. The new user responses can be applied to the response normalization model 106, generated from the user responses to the multiple campaigns, to generate a true quality of the new campaign.

The true quality of the new campaign is based on the assumption that the quality of a campaign is primarily based on content. For example, when the new campaign is launched, it is reasonable to assume that the behavioral bias of the population has not changed. As such, the behavioral biases computed from the user responses to the earlier campaigns can be used for the new campaign. Further, the effects of other external factors to the users' responses to the new campaign are negligibly small. Thus, the quality of the content of the new campaign is the main influencer of the user responses. As such, the quality of the content of the new campaign can be estimated and compared with the quality of the content from the previous campaigns.

In other words, the actual response to a campaign is a function of the true response to the campaign and the individual behavioral bias of users in the population. Assuming a linear model, this can be expressed as:

$$\text{Actual Response} = \text{Alpha} * \text{TrueResponse} + \text{Beta} * \text{PessiOptiScore} + \text{Epsilon for all users}$$

Here, the Pessi-OptiScore and actual response for each individual are known, and Alpha, True Response, and Epsilon can be estimated.

Alpha can be used to indicate the "quality" of the new campaign, and can be computed for each new campaign. As such, Alpha can be used to compare all campaigns by a business or brand on a social network, and social marketers can monitor Alpha to determine whether Alpha is improving or worsening with each new campaign. It is to be appreciated that in some cases, Alpha can be separately determined for pessimists, optimists and realists. Alpha may also be determined for various different types of social posts, such as posts with a picture, posts with a video, posts with a link, posts intended to be humorous, and the like.

Response Normalization Model Use Cases

Response normalization model 106 can be used for a variety of different benefits on a variety of different channels.

In one or more implementations, the response normalization model 106 can be used to compare results of a survey by normalizing the results to achieve a better understanding of the target audience and to evaluate them appropriately.

In one or more implementations, the response normalization model 106 can be used to measure the success of a marketing campaign (e.g., a social media marketing campaign). A campaign may result in varying levels of engagement (e.g., low, medium, or high engagement). For example, the level of engagement for a social post to a page on a page on Facebook® may result in a low, medium, or high number of likes, comments, shares, and/or clicks. Conventional solutions can measure the number of likes, shares, and comments to arrive at a quantum level of engagement. However, this quantum level of engagement may not be the true level of engagement.

For example, users respond to campaign based on their "stimulation thresholds". A user with a low stimulation threshold may respond with high engagement, whereas a user with a high threshold may respond with low engagement. Marketers and businesses would like to be able to understand the true levels of engagement from a campaign regardless of the variability in threshold levels across campaign participants. Accordingly, response normalization model 106 can be used to compute the true engagement levels of a campaign, similar to how the true user responses are computed in FIG. 4.

For example, in the case of a social post to Facebook®, the levels of engagement can be likes, comments, and shares. In general, a user does not share a social post unless the user is very stimulated by the social post. Thus, sharing a post can be considered to be the highest level of engagement for a Facebook® post. Further, marketers place a higher value on shares, as opposed to comments or likes, because sharing a post enables the post to be seen by the share's personal network. Thus, in this example shares can be weighted higher when calculated the engagement level of the campaign to generate the true success of the campaign.

In one or more implementations, response normalization model 106 can be used to aggregate sentiment of a social post by normalizing the sentiment using the personality of each user. For example, social marketers are interested in maximizing the positive engagement for social posts to social network, such as Facebook®. A typical Facebook® brand page, for example, may attract hundreds of comments by users that subscribe to, or like, the brand page. Response normalization model 106 can be used to generate a sentiment scoring engine to find the positivity or negativity for each comment. Marketers would like to get a global sense of the true sentiment across all the comments of a social post. As described throughout, however, one cannot simply add or average the sentiment scores across all comments because of the individual behavioral biases of the users that respond to the social post. Thus, in some case, response normalization model can be used to reveal the true response to a social post at a global level, without necessarily discerning the true sentiment for each individual user.

In one or more implementations, response normalization model 106 can be used to enable customized customer service. For example, response normalization model 106 can be used to determine whether a customer is an optimist or a pessimist. This information may be provided to a business to enable the business to the handle customers in a certain way based on whether the customer is a pessimist or an optimist.

In one or more implementations, response normalization model 106 can be used to identify pessimists and optimists to enable advertisement and/or content targeting. For example, response normalization model 106 can estimate with a reasonable level of confidence, a potential customer's individual personality, on the pessimist to optimist scale. This information can then be used by businesses to target advertisements that potentially can result in higher conversion. For example, if a user is identified as a pessimist, and the weather on a particular day is cold and rainy, a company could target an advertisement to the pessimist that showcases umbrellas. Alternately, on the same rainy day, a business might target premium brands of hot cocoa to optimists.

In one or more implementations, response normalization model 106 can be used by social recommendation systems to give a more precise rating to content to ensure that social recommendations are targeted to the right set of users.

Example Procedures

The following discussion describes techniques for generating response normalization model 106 (FIG. 5), and for normalizing user responses to an event using the response normalization model (FIG. 6) that may be implemented utilizing the systems and devices described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1, 2, and 4.

Figure 5:
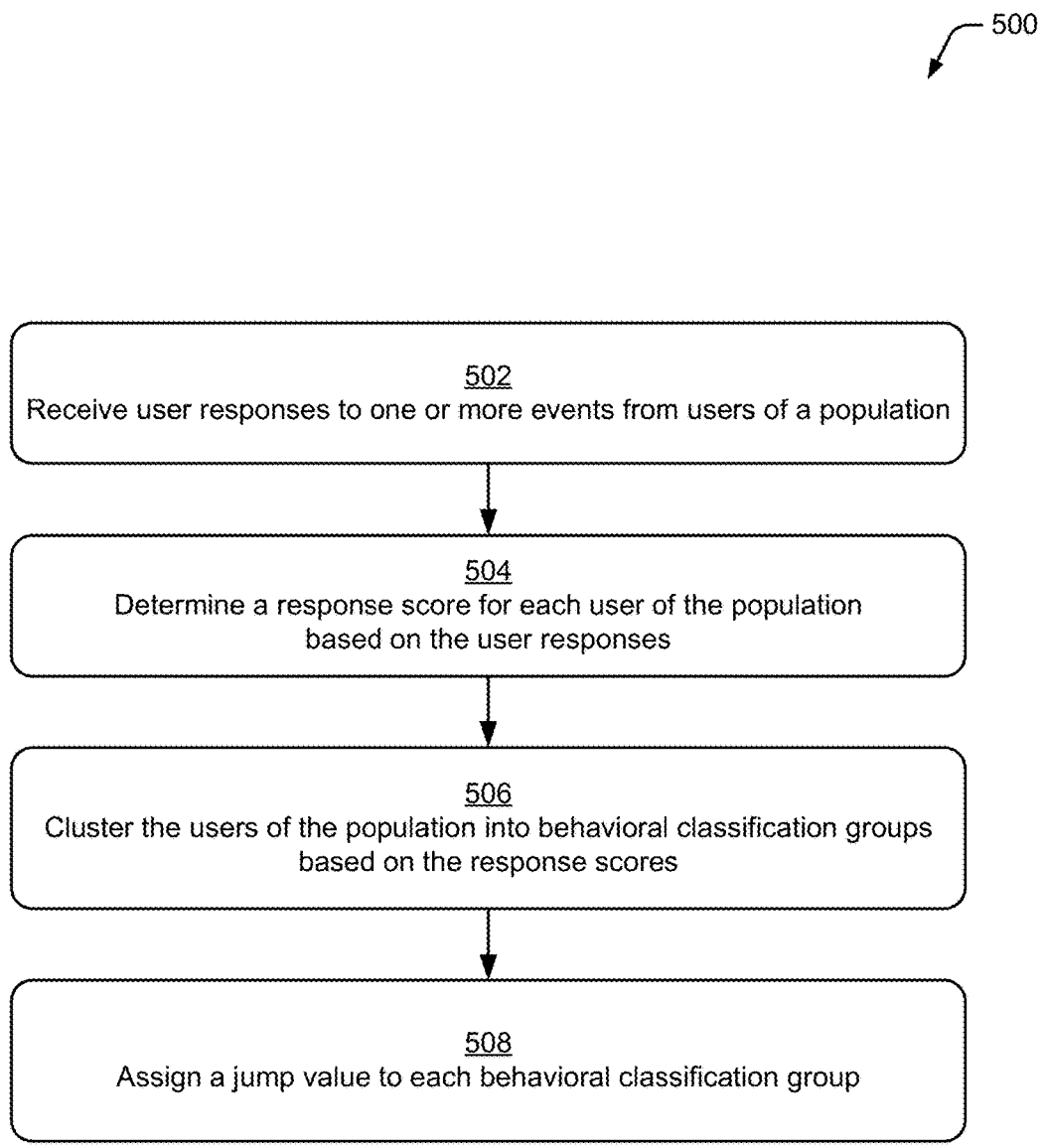
FIG. 5 illustrates a procedure in an example implementation in which a response normalization model is generated.

FIG. 5 illustrates a procedure 500 in an example implementation in which response normalization model 106 is generated.

At 502, user responses to one or more events are received from users of a population. For example, behavioral classification module 104 (FIG. 1) receives user responses 202 (FIG. 2) to one or more events from users of a population.

At 504, a response score is determined for each user of the population based on the user responses. For example, behavioral classification module 104 determines a response score 204 for each user of the population based on the user responses 202.

At 506, the users of the population are clustered into behavioral classification groups based on the response scores. For example, behavioral classification module 104 clusters the users of the population into behavioral classification groups 206 or 208 based on the response scores 204.

At 508, a jump value is assigned to each behavioral classification group. For example, behavioral classification module 104 assigns jump value 210 to first behavioral classification group 206 and assigns jump value 212 to second behavioral classification group 208. The jump values are configured to remove behavioral bias from user responses.

Figure 6:
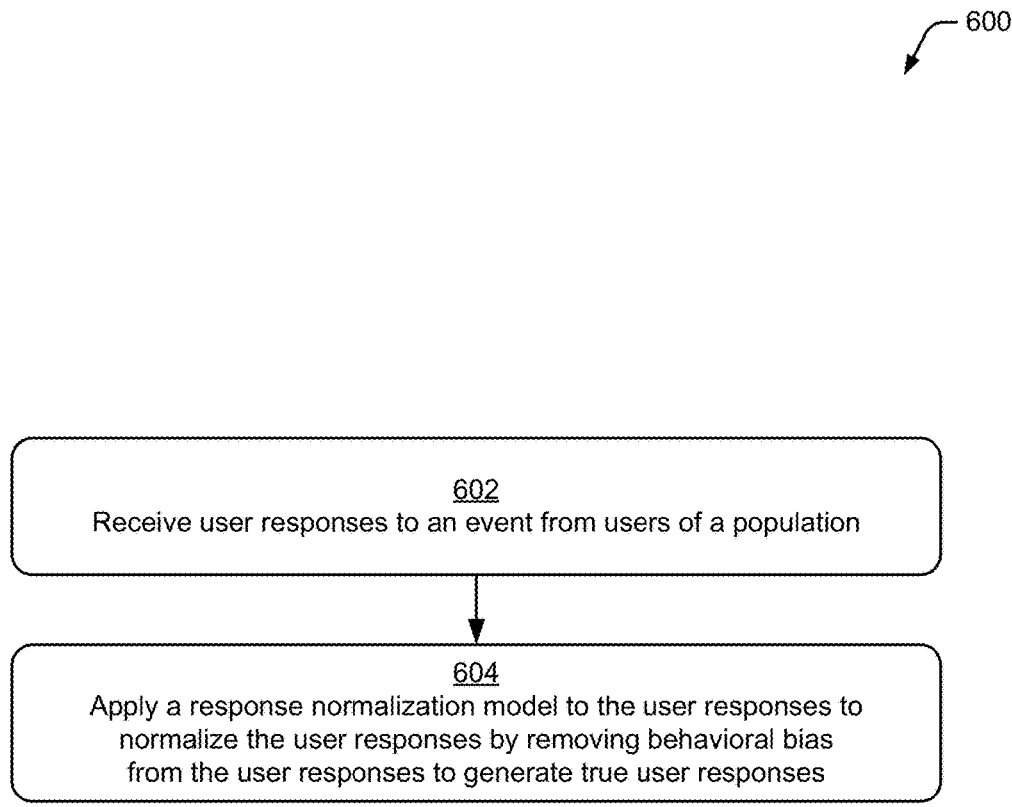
FIG. 6 illustrates a procedure in an example implementation in which user responses to an event are normalized using a response normalization model.

FIG. 6 illustrates a procedure 600 in an example implementation in which user responses to an event are normalized using response normalization model 106.

At 602 user responses to an event are received from users of a population. For example, behavioral classification module 104 (FIG. 1) receives user responses 402 (FIG. 4) to an event from users of a population.

At 604, a response normalization model is applied to the user responses to normalize the user responses by removing behavioral bias from the user responses to generate true user responses. For example, behavioral classification module 104 applies response normalization model 106 to user responses 402 to normalize the user response by removing behavioral bias from the user responses to generate true user responses 406.

Having described example procedures in accordance with one or more implementations, consider now an example system and device that can be utilized to implement the various techniques described herein.

Example System and Device

Figure 7:
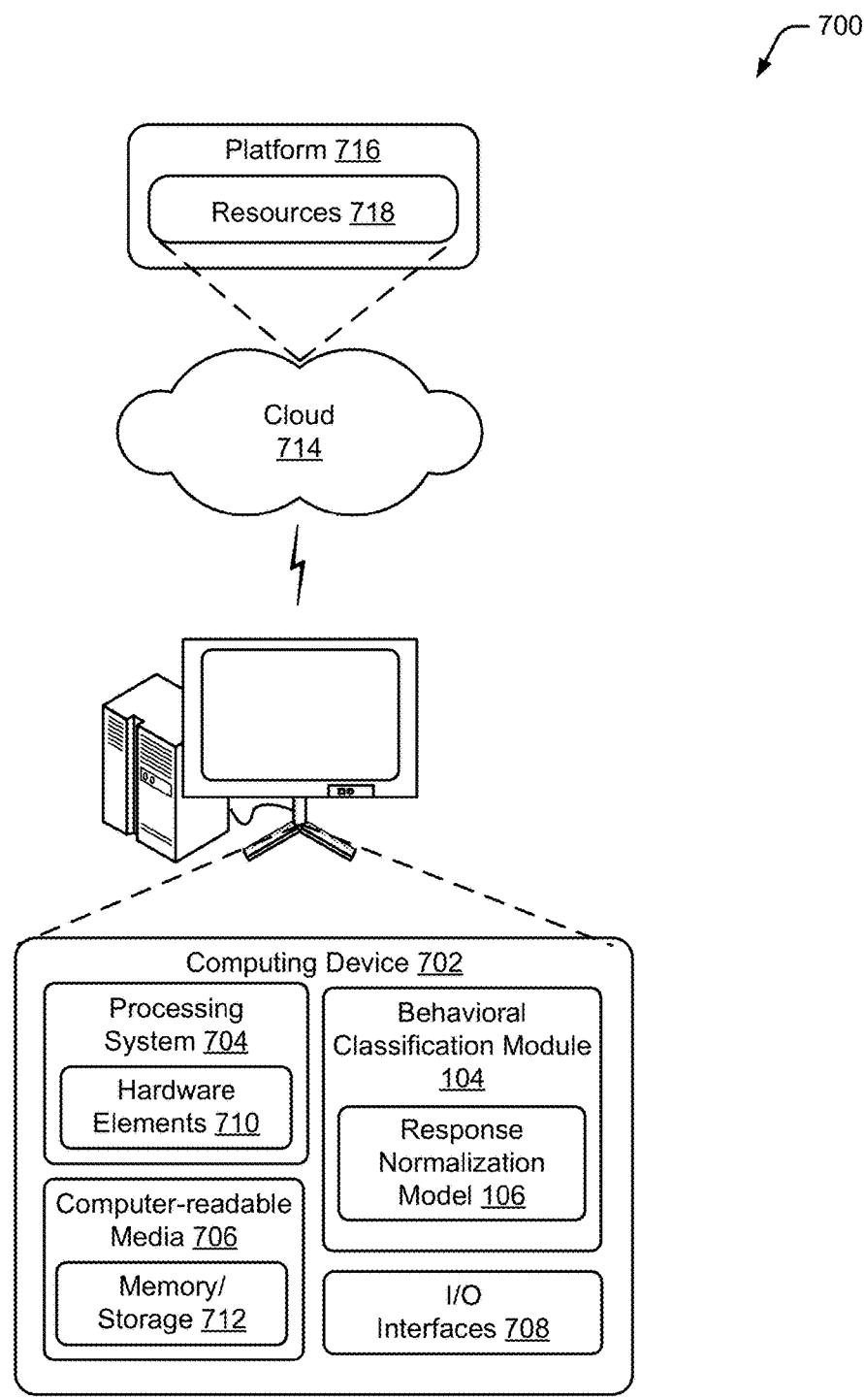
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of behavioral classification module 104 and response normalization model 106, which operate as described above. The computing device 702 maybe, for example, a server of a service provider, a device associated with a client (e.g., a client device), an on-chip system, and/or any other suitable computing device or computing system.

The example computing device 702 is illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
receiving, by the one or more computing devices, user responses to a campaign posted on a social network from users of a population;
generating, by the one or more computing devices, a response score for each user of the population based on the user responses and associating each response score with an identifier of a respective user;
generating, by the one or more computing devices, a response normalization model for the population by:
generating clustered data for the user identifiers based on the response scores, the clustered data including at least a first behavioral classification group that includes user identifiers with response scores that are lower relative to the users of the population of users, and a second behavioral classification group that includes user identifiers with response scores that are higher relative to the users of the population;
assigning a first jump value to the first behavioral classification group and assigning a second jump value to the second behavioral classification group, the first jump value and the second jump value configured to remove behavioral bias from user responses;
receiving, by the one or more computing devise, additional user responses to an additional campaign posted on the social network from at least a portion of the users of the population;
removing, by the one or more computing devise, behavioral bias from the additional user responses by applying the response normalization model to the additional user responses, the applying the response normalization model adjusting additional response scores associated with the additional user responses by increasing the additional response scores of user identifiers associated with the first behavioral classification group and decreasing additional response scores of user identifiers associated with the second behavioral classification group;
outputting, by the one or more computing devices, a true response score for the additional campaign based on the adjusted additional response scores associated with the additional user responses, the true response score indicating an effectiveness of the additional campaign; and
controlling, by the one or more computing devices, distribution of the additional campaign to users of the population via the social network based on the true response score, the controlling comprising one of adjusting distribution of the additional campaign to at least a subset of users of the population or ending distribution of the additional campaign based on the true response score.

2. The computer-implemented method of claim 1, wherein the generating the clustered data further comprises:
ordering the user identifiers of the population based on the response scores; and
generating the clustered data by clustering a first cut-off percentage of user identifiers with low response scores into the first behavioral classification group, and clustering a second cut-off percentage of user identifiers with high response scores into the second behavioral classification group.

3. The computer-implemented method of claim 1, wherein the first behavioral classification group comprises a pessimist group that includes user identifiers with response scores that are negative on a negative-to-positive scale relative to the response scores of the users in the population, and wherein the second behavioral classification group comprises an optimist group that includes user identifiers with response scores that are positive on the negative-to-positive scale relative to the response scores of the users in the population.

4. The computer-implemented of claim 1, wherein the removing behavioral bias from the additional user responses comprises determining an additional response score for each of the additional user responses, and normalizing each additional response score by applying the first or second jump value to each additional response score to generate true user responses to the additional campaign.

5. The computer-implemented of claim 4, wherein the normalizing the additional user responses further comprises, for each additional user response:
identifying a user of the additional user response;
identifying whether the user is associated with the first or second behavioral classification group; and
adjusting the additional response score of the additional user response by the first or second jump value assigned to the identified first or second behavioral classification group of the user.

6. The computer-implemented method of claim 4, further comprising identifying one or more unusual user responses from the additional user responses based on the one or more unusual user responses including an additional response score that is outside of a range of response scores associated with the first or second behavioral classification group of a user of the additional user response.

7. The computer-implemented method of claim 1, wherein the user responses comprise user interactions with a social post that is posted on the social network, and wherein the response scores are determined based on types of the user interactions.

8. The computer-implemented method of claim 1, wherein the user responses comprise user answers to questions of a survey posted on the social network.

9. One or more computer-readable storage media comprising instructions stored thereon that, responsive to execution by a computing device, cause the computing device to perform operations comprising:
receiving user responses to a campaign posted on a social network from one or more users of a population; and
applying a response normalization model to the user responses to the campaign posted on the social network to normalize the user responses by removing behavioral bias from the user responses to generate true user responses, the response normalization model comprising clustered data defining at least a first and second behavioral classification group for users of the population and at least a first and second jump value associated with the first and second behavioral classification groups, and the response normalization model configured to normalize each of the user responses to the campaign posted on the social network by:
identifying a user of a user response;
identifying whether the user is associated with the first or second behavioral classification group in the response normalization model;
applying the first or second jump value associated with the identified first or second behavioral classification group of the user to generate a true user response;

outputting a true response score for the campaign based on normalized user responses, the true response score indicating an effectiveness of the campaign; and controlling output of functionality that is selectable to adjust distribution of the campaign based on the true response score.

10. The one or more computer-readable storage media of claim 9, wherein the response normalization model is generated from previous user responses to one or more previous campaigns posted on the social network by users of the population.

11. The one or more computer-readable storage media of claim 9, wherein the applying the first or second jump value further comprises adjusting a response score of the user response by the first or second jump value to generate the true response score.

12. The one or more computer-readable storage media of claim 9, wherein the first behavioral classification group of the user comprises one of a pessimist group, a realist group, or an optimist group, and wherein the second behavioral classification group of the users comprises a different one of the pessimist group, the realist group, or the optimist group.

13. The one or more computer-readable storage media of claim 12, wherein applying the first or second jump value further comprises:
increasing a response score of the user response if the identified first or second behavioral classification group of the user comprises the pessimist group; or
decreasing the response score of the user response if the identified first or second behavioral classification group of the user comprises the optimist group.

14. The one or more computer-readable storage media of claim 9, wherein the user responses comprise user interactions with a social post that is posted on the social network.

15. The one or more computer-readable storage media of claim 9, wherein the user responses comprise user answers to questions of a survey posted on the social network.

16. The one or more computer-readable storage media of claim 9, wherein the first behavioral classification group comprises a first cut-off percentage of users with low response scores, and the second behavioral classification group comprises a second cut-off percentage of users with high response scores.

17. A computing device comprising:
at least a memory and a processor to implement a behavioral classification module, the behavioral classification module configured to:
determine response scores for users of a population based on user responses to one or more campaigns posted on a social network;
order the users of the population based on the response scores;
generate clustered data by clustering a first cut-off percentage of users with low response scores into a first behavioral classification group, clustering a second cut-off percentage of users with high response scores into a second behavioral classification group, and clustering remaining users of the population into a third behavioral classification group;
assign jump values to at least the first behavioral classification group and the second behavioral classification group, each jump value configured to remove behavioral bias from subsequent user responses to a subsequent campaign posted on the social network by users of the population;
receive the subsequent user responses to the subsequent campaign from the users of the population;
normalize the subsequent user responses by applying a respective jump value to each subsequent user response based on the assigned jump value of the first behavioral classification group or the second behavioral classification group;
output a true response score for the subsequent campaign based on normalized user responses, the true response score indicating an effectiveness of the subsequent campaign; and
control output of functionality that is selectable to adjust distribution of the campaign based on the true response score.

18. The computing device of claim 17, wherein:
the jump value assigned to the first behavioral classification group increases a response score of subsequent user responses by users in the first behavioral classification group; and
the jump value assigned to the second behavioral classification group decreases a response score of subsequent user responses by users in the second behavioral classification group.

19. The computing device of claim 17, wherein the first behavioral classification group comprises a pessimist group, the second behavioral classification group comprises an optimist group, and the third behavioral classification group comprises a realist group.

20. The computing device of claim 17, wherein the user responses comprise user interactions with a social post on the social network.

* * * * *